(12) United States Patent
Hu

(10) Patent No.: US 7,975,970 B2
(45) Date of Patent: Jul. 12, 2011

(54) FLAT PANEL DISPLAY SUPPORT

(75) Inventor: Chi-Lung Hu, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 401 days.

(21) Appl. No.: 12/175,790

(22) Filed: Jul. 18, 2008

(65) Prior Publication Data
US 2010/0012810 A1   Jan. 21, 2010

(51) Int. Cl.
*A47F 5/12*   (2006.01)

(52) U.S. Cl. ..................... 248/136; 248/447; 248/454

(58) Field of Classification Search .................. 248/473, 248/474, 444, 447, 454, 455, 456, 457, 460, 248/462, 463, 465, 133, 136, 140, 142, 150, 248/371, 372.1, 291.1, 292.13; 40/754, 755, 40/756; 361/679.21, 679.27, FOR. 104; 211/105, 202
See application file for complete search history.

(56) References Cited

U.S. PATENT DOCUMENTS

| | | | | |
|---|---|---|---|---|
| 7,301,759 B2 * | 11/2007 | Hsiung | ..................... | 361/679.27 |
| 7,467,773 B2 * | 12/2008 | Ogawa et al. | .................. | 248/472 |
| 7,628,365 B2 * | 12/2009 | Lee | ........................... | 248/297.21 |
| 7,735,797 B2 * | 6/2010 | Hu | ................................ | 248/371 |
| 7,753,336 B2 * | 7/2010 | Hu | ................................ | 248/688 |
| 2003/0189155 A1 * | 10/2003 | Serbinski et al. | ............. | 248/371 |
| 2005/0109893 A1 * | 5/2005 | Chueh et al. | .................. | 248/133 |
| 2005/0253040 A1 * | 11/2005 | Yang | ............................ | 248/688 |
| 2010/0243850 A1 * | 9/2010 | Derry | ......................... | 248/372.1 |

* cited by examiner

*Primary Examiner* — A. Joseph Wujciak, III
(74) *Attorney, Agent, or Firm* — C. G. Mersereau; Nikolai & Mersereau, P.A.

(57) ABSTRACT

A flat panel display (FPD) support has a panel bracket attached to an FPD and a supporting assembly attached to and supporting the panel bracket and the FPD. The supporting assembly comprises a pivoting leg, an adjustment bracket, a stationary bracket and a lock. The adjustment bracket is pivotally and slidably connected to the pivoting leg. The lock selectively engages the adjustment bracket. The stationary bracket holds the lock to prevent the lock from sliding relative to the panel bracket. Therefore, a visual angle of the FPD relative to a plane can be easily adjusted by the supporting assembly and held by the lock. The FPD with the FPD support is light, simple and portable and can be conveniently packaged for sale or transportation and does not occupy a large area when in use.

20 Claims, 8 Drawing Sheets

FLAT PANEL DISPLAY SUPPORT

BACKGROUND OF THE INVENTION

1. Field of the Invention

The present invention relates to a flat panel display (FPD) support, especially to an FPD support that allows an FPD to be stood on a plane and a visual angle of the FPD adjusted.

2. Description of the Prior Arts

A flat panel display (FPD) is mounted on an FPD support with a hinge. The hinge allows the FPD to pivot relative to the FPD support and to adjust a visual angle of the FPD.

A conventional FPD support has a large base to stand stably on a plane. Consequently, the FPD with the conventional FPD support requires a large box for sale and has a large footprint, occupying a large area of a desk or table when in use.

To overcome the shortcomings, the present invention provides an FPD support to mitigate or obviate the aforementioned problems.

SUMMARY OF THE INVENTION

The main objective of the present invention is to provide a flat panel display (FPD) support. The FPD support has a panel bracket attached to an FPD and a supporting assembly attached to and supporting the panel bracket and the FPD. The supporting assembly comprises a pivoting leg, an adjustment bracket, a stationary bracket and a lock. The adjustment bracket is pivotally and slidably connected to the pivoting leg. The lock selectively engages the adjustment bracket. The stationary bracket holds the lock to prevent the lock from sliding relative to the panel bracket. Therefore, a visual angle of the FPD relative to a plane can be easily adjusted by the supporting assembly and held by the lock. The FPD with the FPD support is light, simple and portable and can be conveniently packaged for sale or transportation and does not occupy a large area when in use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
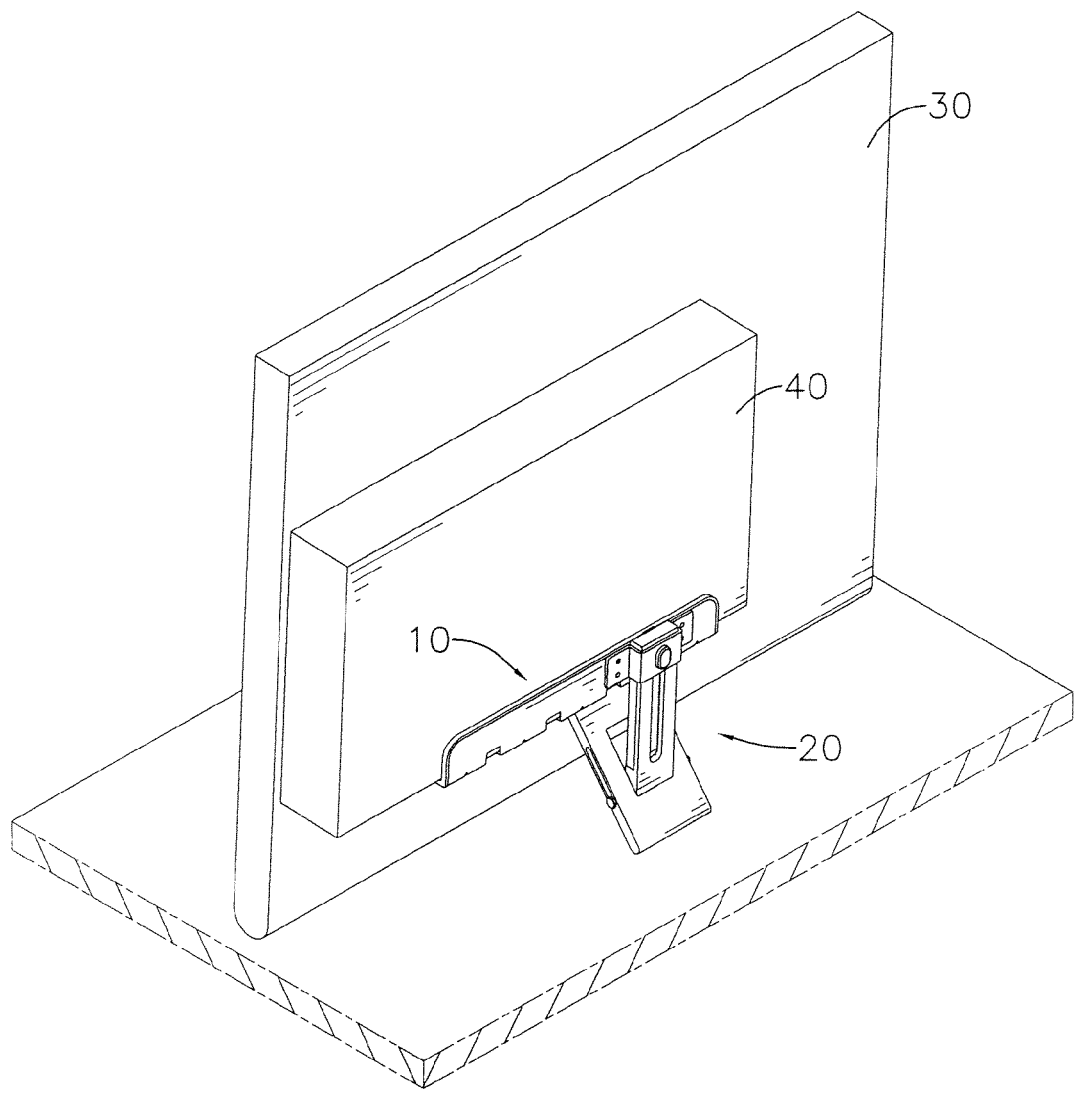
FIG. 1 is an operational perspective view of a flat panel display (FPD) support in accordance with the present invention with an FPD and a periphery device.

With reference to FIG. 1, a flat panel display (FPD) support in accordance with the present invention is attached to an FPD (30) and comprises a panel bracket (10) and a supporting assembly (20).

Figure 2:
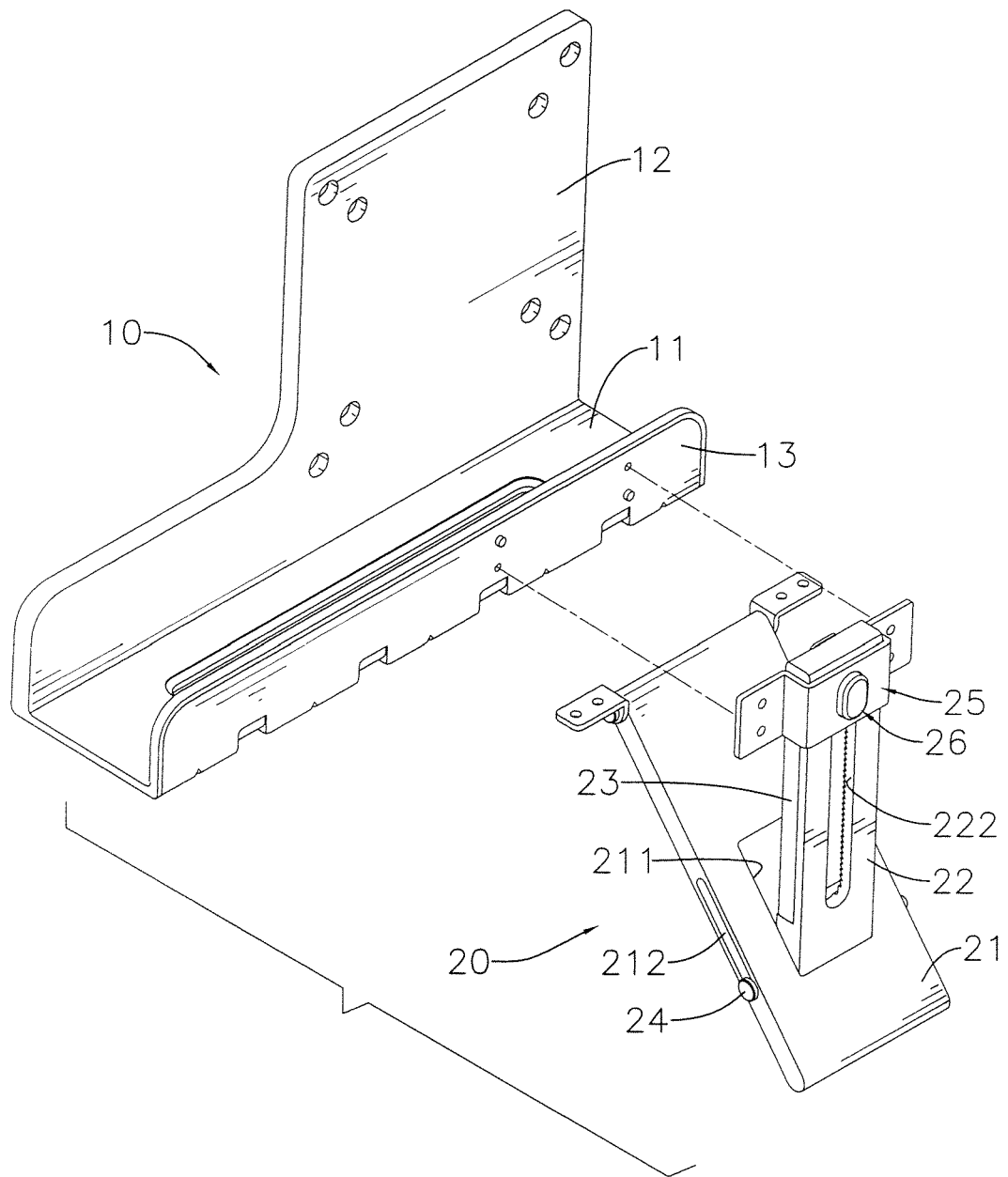
FIG. 2 is a partially exploded perspective view of the FPD support in FIG. 1.
Figure 7:
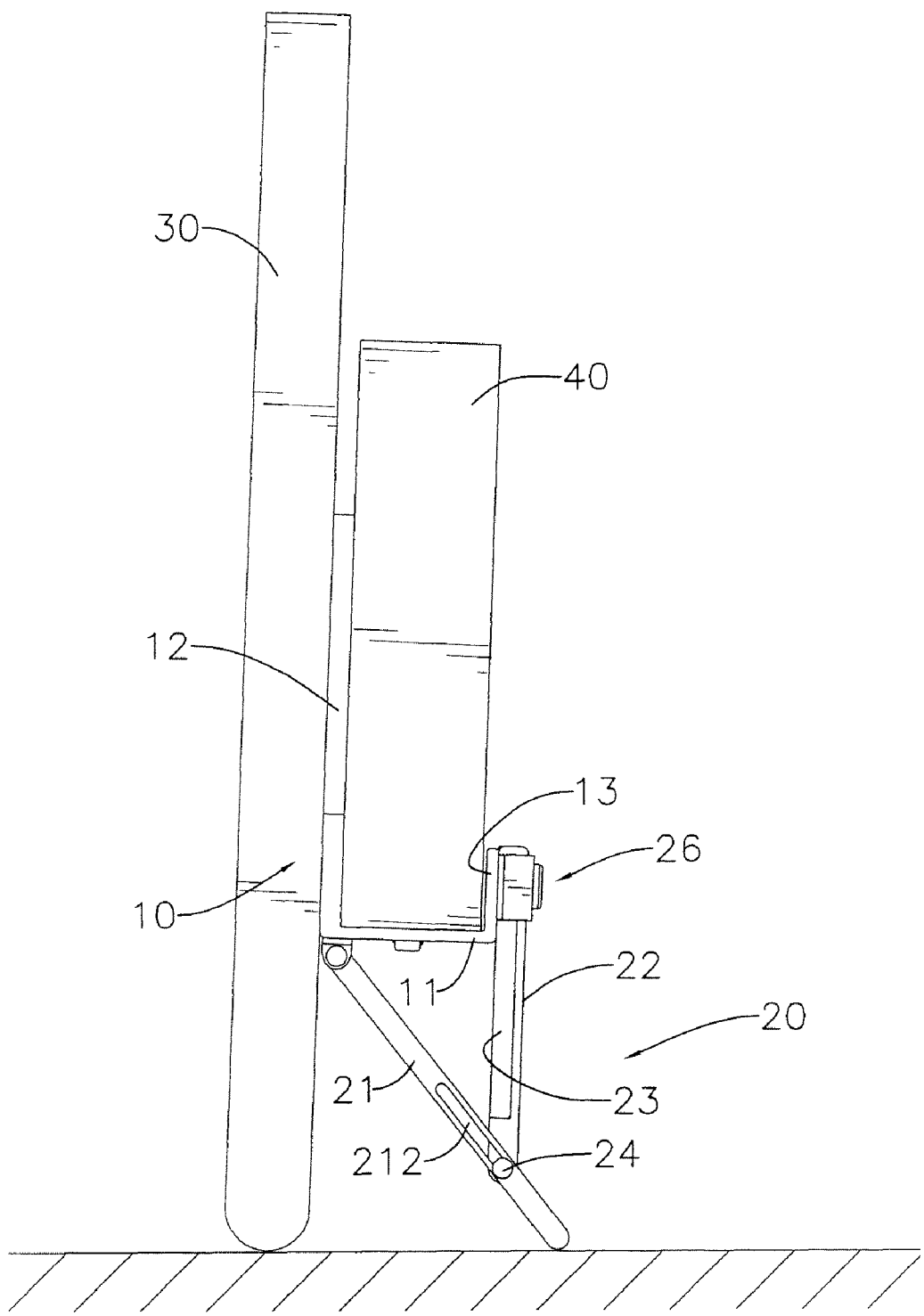
FIG. 7 is an operational side view of the FPD support with an FPD and a periphery device in FIG. 1, shown vertical.

With further reference to FIGS. 2 and 7, the panel bracket (10) is attached to the FPD (30) and may be formed on the FPD (30), may be substantially U-shaped to hold a periphery device (40) and may have a bottom (11), an inner wall (12) and an outer wall (13). The bottom (11) has an inner edge and an outer edge. The inner wall (12) is attached to the FPD (30) and is formed on and protrudes from the inner edge of the bottom (11). The outer wall (13) is formed on and protrudes from the outer edge of the bottom (11). The periphery device (40) may be a hard drive, solid state memory, digital video recorder, signal decoder or the like.

Figure 3:
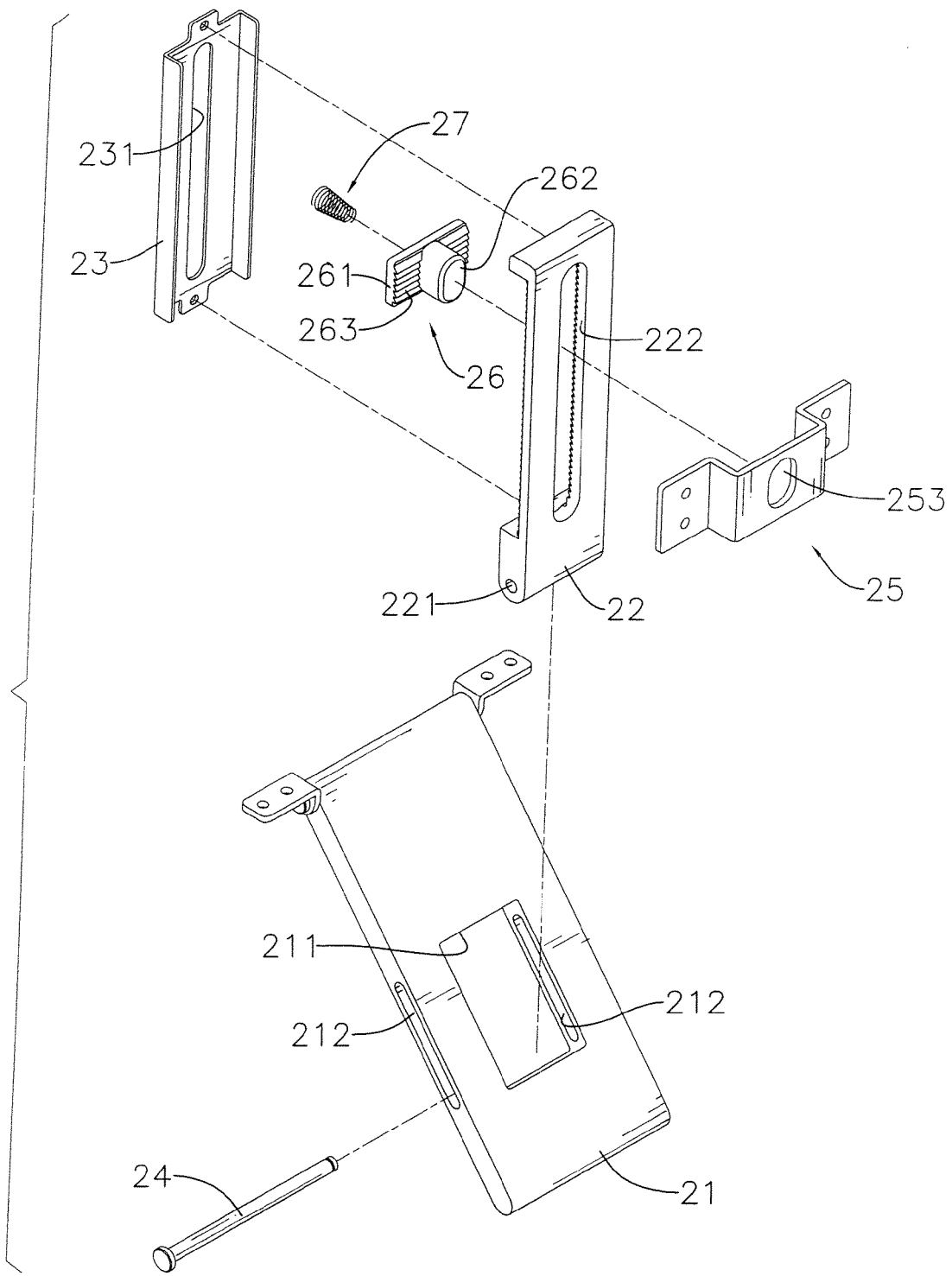
FIG. 3 is an exploded perspective view of the FPD support in FIG. 1, showing the supporting assembly.

With further reference to FIG. 3, the supporting assembly (20) is attached to and supports the panel bracket (10) and has a pivoting leg (21), an adjustment bracket, a stationary bracket (25) and a lock.

Figure 4:
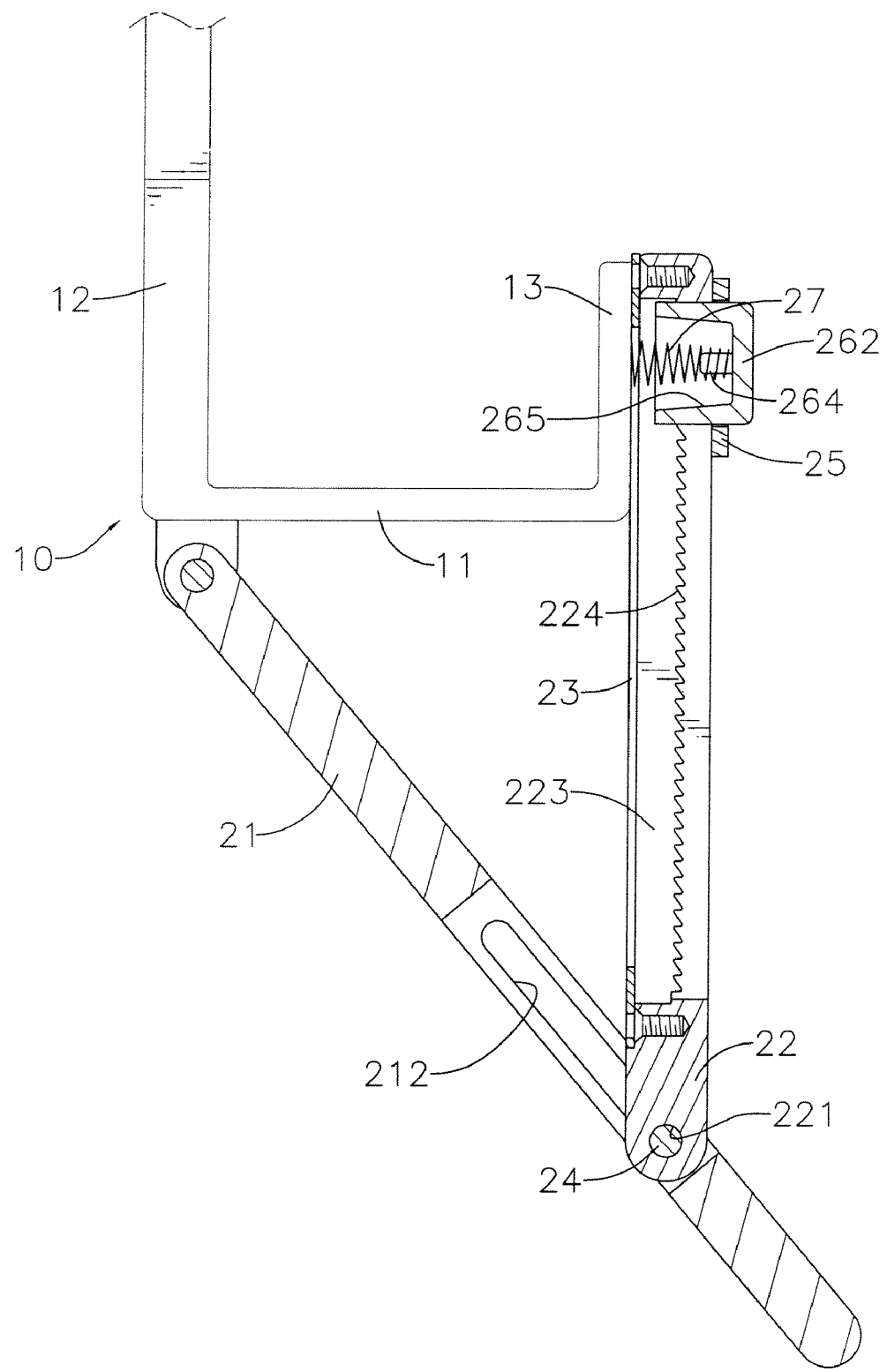
FIG. 4 is an enlarged side view in partial section of the FPD support in FIG. 1.

With further reference to FIG. 4, the pivoting leg (21) is pivotally connected to the panel bracket (10) and may have a pivot edge, two opposite side edges, a through hole (211) and two elongated slots (212). The pivot edge of the pivoting leg (21) is pivotally connected to the panel bracket (10) and may be pivotally connected to the bottom (11) of the panel bracket (10). The through hole (211) is formed through the pivoting leg (21). The elongated slots (212) are respectively formed through the side edges of the pivoting leg (21), communicate with the through hole (211) of the pivoting leg (21) and are elongated perpendicular to the pivot edge of the pivoting leg (21).

The adjustment bracket has an outer guiding bracket (22), an optional inner guiding bracket (23) and an optional sliding rod (24).

The outer guiding bracket (22) is pivotally and slidably mounted on the pivoting leg (10), may be mounted through the through hole (211) of the pivot leg (21) and has a pivot edge, an inner surface, an optional rod hole (221), an elongated hole (222), an optional guiding groove (223) and an engaging surface (224). The rod hole (221) is formed through the outer guiding bracket (22), is adjacent to and parallel to the pivot edge of the outer guiding bracket (22) and aligns with the elongated slots (212) of the pivoting leg (21). The elongated hole (222) is formed through the outer guiding bracket (22) and may be elongated perpendicular to the pivot edge of the outer guiding bracket (22). The guiding groove (223) is formed in the inner surface of the outer guiding bracket (22) parallel with the elongated hole (222) of the outer guiding bracket (22) and has a bottom. The engaging surface (224) is formed on the inner surface of the outer guiding bracket (22), may comprise multiple teeth and may be formed on the bottom of the guiding groove (223) of the outer guiding bracket (22).

The inner guiding bracket (23) is securely mounted on the inner surface of the outer guiding bracket (22) and has an elongated hole (231). The elongated hole (231) is formed through the inner guiding bracket (23) and aligns with the elongated hole (222) of the outer guiding bracket (22).

The sliding rod (24) is mounted through the elongated slots (212) of the pivoting leg (21) and the rod hole (221) of the outer guiding bracket (22) to allow the pivot edge of the outer guiding bracket (22) to pivot in and slide along the elongated slots (212) of the pivoting leg (21).

The stationary bracket (25) is substantially U-shaped, is mounted on and around the adjustment bracket, is attached to the panel bracket (10), may be attached to the outer wall (13) of the panel bracket (10) and has a lock hole (253). The lock hole (253) is formed through the stationary bracket (25) and aligns with the elongated hole (222) of the outer guiding bracket (22).

The lock has a button (26) and a resilient device (27).

The button (26) is mounted on the inner surface of the outer guiding bracket (22), may be mounted in the guiding groove (223) of outer guiding bracket (22), has a plate (261) and a pressing protrusion (262) and may have a mounting recess (265) and a positioning protrusion (264). The plate (261) has an outer surface, an inner surface and an engaging surface (263). The engaging surface (263) is formed on the outer surface of the plate (261), may comprise multiple teeth and corresponds to and selectively engages the engaging surface (224) of the outer guiding bracket (22). The pressing protrusion (262) is formed on the outer surface of the plate (261), is mounted through the elongated hole (222) of the outer guiding bracket (22) and the lock hole (253) of the stationary bracket (25) and may have a closed end. Therefore, the stationary bracket (25) and the button (26) do not slide relative to the panel bracket (10). The mounting recess (265) is formed in the inner surface of the plate (261) and the pressing protrusion (262). The positioning protrusion (264) is formed on and protrudes from the closed end of the pressing protrusion (262) in the mounting recess (265).

The resilient device (27) may be mounted through the elongated hole (231) of the inner guiding bracket (23), is mounted between and presses against the panel bracket (10) and the button (26), may press against the outer wall (13) of the panel bracket (10) and the inner surface of the plate (261) of the button (26) and may be a spring. The spring is mounted in the mounting recess (265) of the button (26), may be mounted around the positioning protrusion (264) of the button (26) and presses against the closed end of the pressing protrusion (262) and the panel bracket (10).

Figure 5:
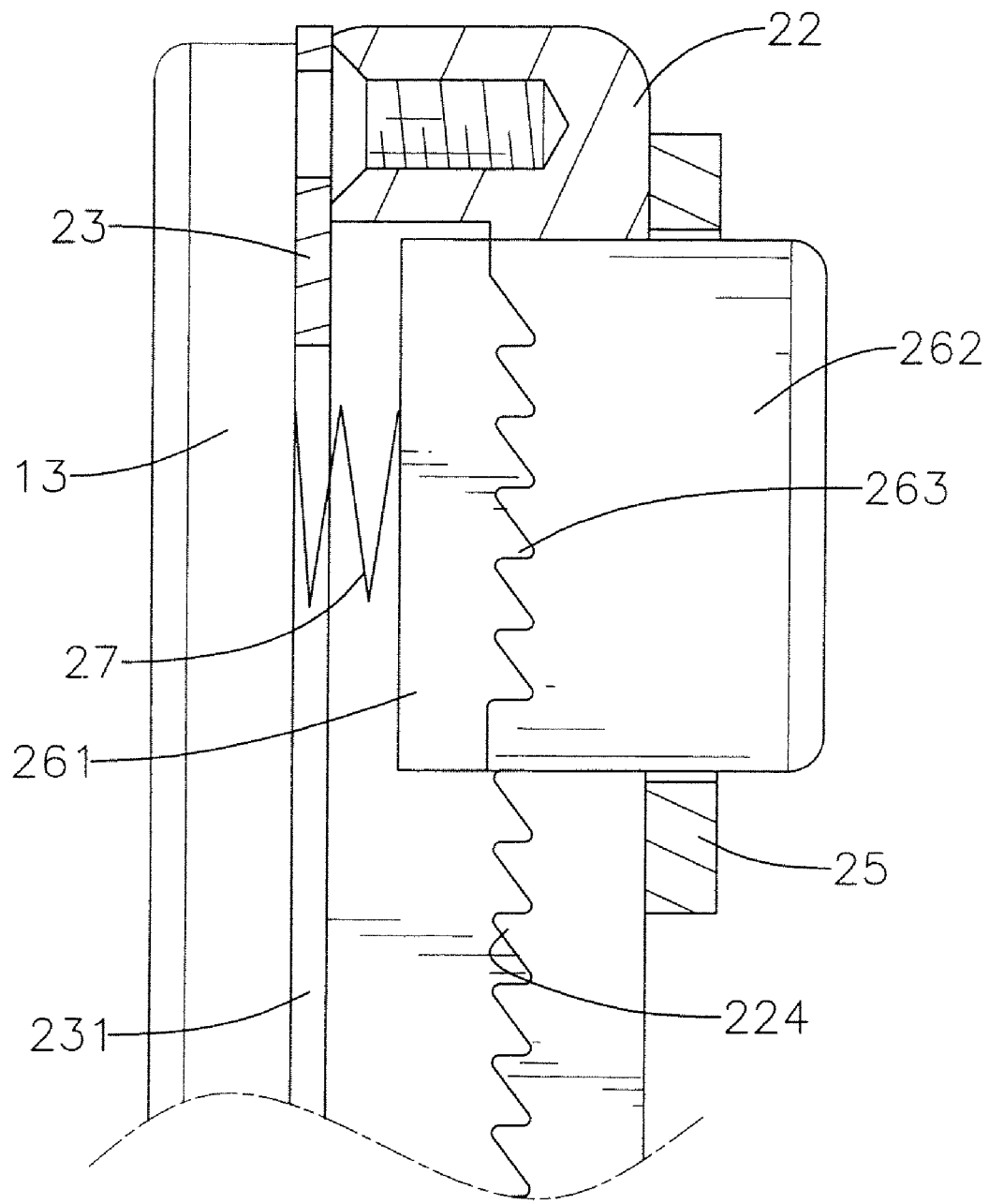
FIG. 5 is an enlarged side view in partial section of the FPD support in FIG. 1, showing an outer guiding bracket engaging a button.

With further reference to FIG. 5, the resilient device (27) presses against the button (26) to allow the button (26) to stably and firmly engage with the outer guiding bracket (22) in a specific position and to allow the supporting assembly (20) to support the panel bracket (10), the personal computer (40) and the FPD (30).

Figure 6:
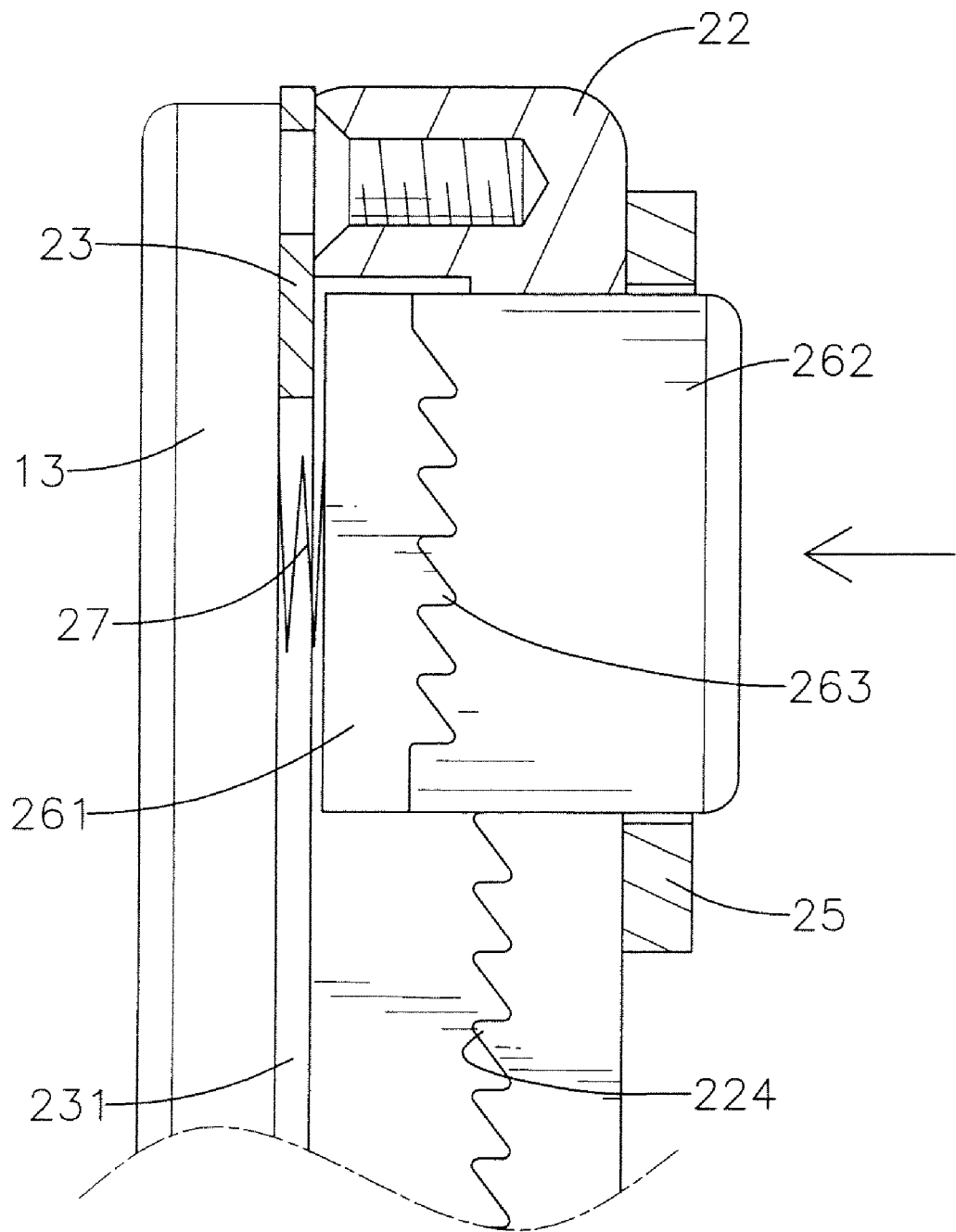
FIG. 6 is an enlarged operational side view in partial section of the FPD support in FIG. 1, showing the outer guiding bracket disengaging from the button.
Figure 8:
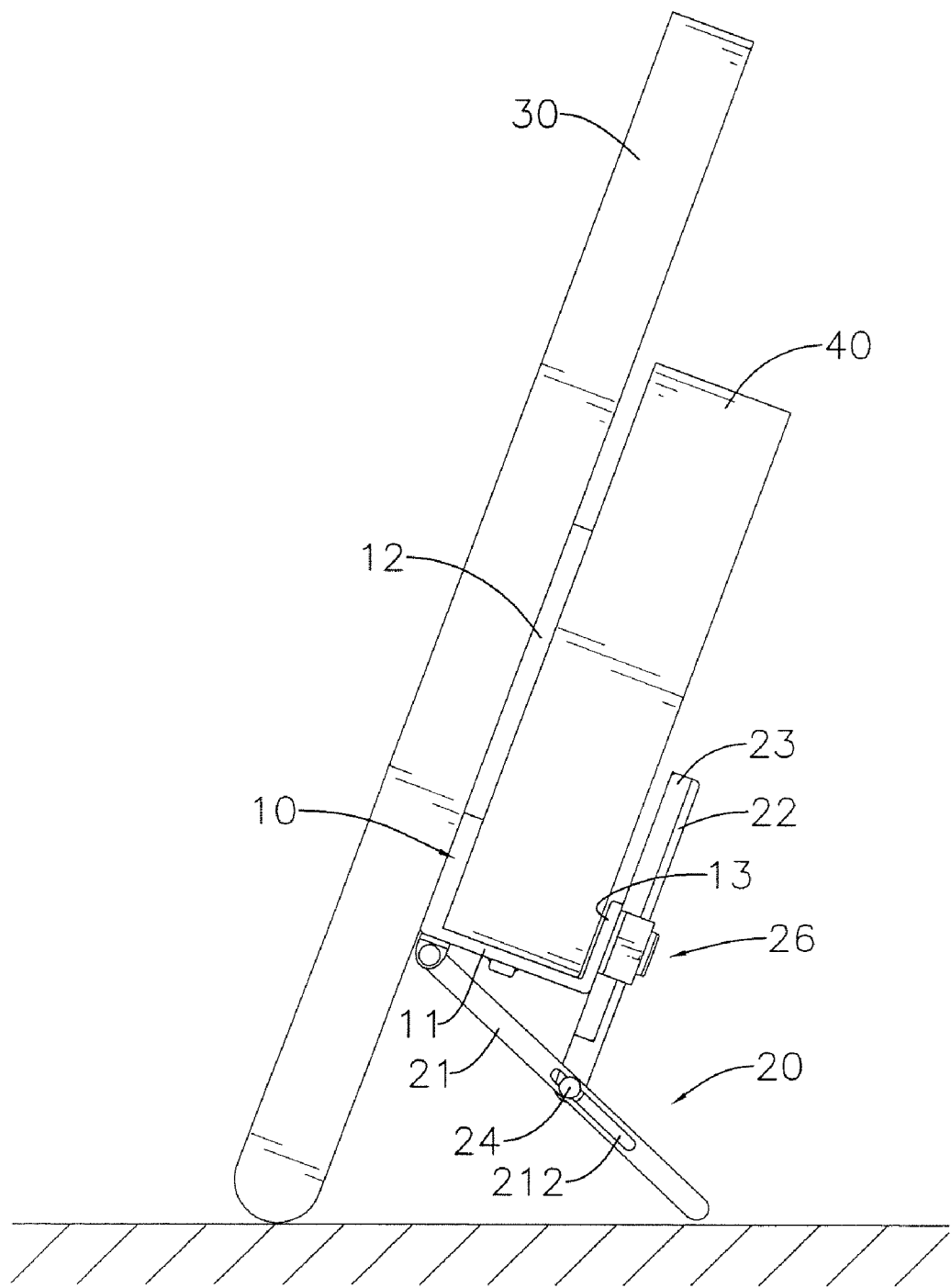
FIG. 8 is an operational side view of the FPD with an FPD and a periphery device support in FIG. 1, shown leaning.

With further reference to FIGS. 6 and 8, when the pressing protrusion (262) of the button (26) is pressed to disengage the engaging surfaces (224, 263) of the outer guiding bracket (22) and the button (26), the outer and the inner guiding brackets (22, 23) can move relative to the button (26) and are guided by the elongated holes (222, 231) of the outer and the inner guiding brackets (22, 23). Meanwhile, the sliding rod (24) allows the outer and the inner brackets (22, 23) to slide along the elongated slots (212) of the pivoting leg (21). Therefore, visual angles of the pivoting leg (21) and the FPD (30) are adjusted and the pivoting leg (20) can stably support the FPD (30).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A flat panel display (FPD) supporting for adjusting the angle of display, comprising:
    a panel bracket; and
    a supporting assembly being attached to and supporting the panel bracket and having a pivoting leg being pivotally connected to the panel bracket;
        an adjustment bracket having an outer guiding bracket being pivotally and slidably mounted on the pivoting leg and having
            an inner surface;
            an elongated hole being formed through the outer guiding bracket; and
            an engaging surface being formed on the inner surface of the outer guiding bracket; and
        a stationary bracket being U-shaped, being mounted on and around the adjustment bracket, being attached to the panel bracket and having a lock hole being formed through the stationary bracket and aligning with the elongated hole of the outer guiding bracket; and
        a lock having
            a button being mounted on the inner surface of the outer guiding bracket and having
                a plate having
                    an outer surface;
                    an inner surface; and
                    an engaging surface being formed on the outer surface of the plate and corresponding to and selectively engaging the engaging surface of the outer guiding bracket; and
                a pressing protrusion being formed on the outer surface of the plate, being mounted through the elongated hole of the outer guiding bracket and the lock hole of the stationary bracket; and
            a resilient device being mounted between and pressing the panel bracket and the button, wherein the button is being pressed to change the angle of display with respect to the pivoting leg.

2. The FPD support as claimed in claim 1, wherein the pivoting leg further has
    a pivot edge being pivotally connected to the panel bracket;
    two opposite side edges;
    a through hole being formed through the pivoting leg; and
    two elongated slots being respectively formed through the side edges of the pivoting leg, communicating with the through hole of the pivoting leg and being elongated perpendicular to the pivot edge of the pivoting leg;
    the outer guiding bracket of the adjustment bracket being pivotally and slidably mounted through the through hole of the pivoting leg and further has
        a pivot edge; and
        a rod hole being formed through the outer guiding bracket, being adjacent to and parallel to the pivot edge of the outer guiding bracket and aligning with the elongated slots of the pivoting leg;
    the elongated hole of the outer guiding bracket is elongated perpendicular to the pivot edge of the outer guiding bracket; and
    the adjustment bracket further has a sliding rod being mounted through the elongated slots of the pivoting leg and the rod hole of the outer guiding bracket.

3. The FPD support as claimed in claim 2, wherein the outer guiding bracket further has a guiding groove being formed in the inner surface of the outer guiding bracket parallel with the elongated hole of the outer guiding bracket and having a bottom;

the engaging surface of the outer guiding bracket is formed on the bottom of the guiding groove of the outer guiding bracket;

the adjustment bracket further has an inner guiding bracket being securely mounted on the inner surface of the outer guiding bracket and having an elongated hole being formed through the inner guiding bracket and aligning with the elongated hole of the outer guiding bracket;

the button of the lock is mounted in the guiding groove of outer guiding bracket; and the resilient device of the lock is mounted through the elongated hole of the inner guiding bracket.

4. The FPD support as claimed in claim 3, wherein the engaging surfaces of the outer guiding bracket and the plate of the button comprise multiple teeth.

5. The FPD support as claimed in claim 4, wherein the pressing protrusion of the button of the lock further has a closed end;

the button of the lock further has a mounting recess being formed in the inner surface of the plate and the pressing protrusion; and the resilient device is a spring being mounted in the mounting recess of the button and pressing against the closed end of the pressing protrusion and the panel bracket.

6. The FPD support as claimed in claim 5, wherein the button further has a positioning protrusion being formed on and protruding from the closed end of the pressing protrusion in the mounting recess; and the resilient device is mounted around the positioning protrusion of the button.

7. The FPD support as claimed in claim 6, wherein the panel bracket is U-shaped and has a bottom having
an inner edge; and
an outer edge;

an inner wall being formed on and protruding from the inner edge of the bottom; and an outer wall being formed on and protruding from the outer edge of the bottom;

the pivot edge of the pivoting leg is pivotally connected to the bottom of the panel bracket;

the stationary bracket is attached to the outer wall of the panel bracket; and the resilient device presses against the outer wall of the panel bracket.

8. The FPD support as claimed in claim 2, wherein the engaging surfaces of the outer guiding bracket and the plate of the button comprise multiple teeth.

9. The FPD support as claimed in claim 8, wherein the pressing protrusion of the button of the lock further has a closed end;

the button of the lock further has a mounting recess being formed in the inner surface of the plate and the pressing protrusion; and the resilient device is a spring being mounted in the mounting recess of the button and pressing against the closed end of the pressing protrusion and the panel bracket.

10. The FPD support as claimed in claim 9, wherein the button further has a positioning protrusion being formed on and protruding from the closed end of the pressing protrusion in the mounting recess; and the resilient device is mounted around the positioning protrusion of the button.

11. The FPD support as claimed in claim 10, wherein the panel bracket is U-shaped and has a bottom having
an inner edge; and
an outer edge;

an inner wall being formed on and protruding from the inner edge of the bottom; and an outer wall being formed on and protruding from the outer edge of the bottom;

the pivot edge of the pivoting leg is pivotally connected to the bottom of the panel bracket;

the stationary bracket is attached to the outer wall of the panel bracket; and the resilient device presses against the outer wall of the panel bracket.

12. The FPD support as claimed in claim 1, wherein the outer guiding bracket further has a guiding groove being formed in the inner surface of the outer guiding bracket parallel with the elongated hole of the outer guiding bracket and having a bottom;

the engaging surface of the outer guiding bracket is formed on the bottom of the guiding groove of the outer guiding bracket;

the adjustment bracket further has an inner guiding bracket being securely mounted on the inner surface of the outer guiding bracket and having an elongated hole being formed through the inner guiding bracket and aligning with the elongated hole of the outer guiding bracket;

the button of the lock is mounted in the guiding groove of outer guiding bracket; and the resilient device of the lock is mounted through the elongated hole of the inner guiding bracket.

13. The FPD support as claimed in claim 12, wherein the engaging surfaces of the outer guiding bracket and the plate of the button comprise multiple teeth.

14. The FPD support as claimed in claim 13, wherein the pressing protrusion of the button of the lock further has a closed end;

the button of the lock further has a mounting recess being formed in the inner surface of the plate and the pressing protrusion; and the resilient device is a spring being mounted in the mounting recess of the button and pressing against the closed end of the pressing protrusion and the panel bracket.

15. The FPD support as claimed in claim 14, wherein the button further has a positioning protrusion being formed on and protruding from the closed end of the pressing protrusion in the mounting recess; and the resilient device is mounted around the positioning protrusion of the button.

16. The FPD support as claimed in claim 15, wherein the panel bracket is U-shaped and has a bottom having
an inner edge; and
an outer edge;

an inner wall being formed on and protruding from the inner edge of the bottom; and an outer wall being formed on and protruding from the outer edge of the bottom;

the pivot edge of the pivoting leg is pivotally connected to the bottom of the panel bracket;

the stationary bracket is attached to the outer wall of the panel bracket; and the resilient device presses against the outer wall of the panel bracket.

17. The FPD support as claimed in claim 1, wherein the engaging surfaces of the outer guiding bracket and the plate of the button comprise multiple teeth.

18. The FPD support as claimed in claim 17, wherein the pressing protrusion of the button of the lock further has a closed end;

the button of the lock further has a mounting recess being formed in the inner surface of the plate and the pressing protrusion; and the resilient device is a spring being mounted in the mounting recess of the button and pressing against the closed end of the pressing protrusion and the panel bracket.

19. The FPD support as claimed in claim 18, wherein the button further has a positioning protrusion being formed on and protruding from the closed end of the pressing protrusion in the mounting recess; and the resilient device is mounted around the positioning protrusion of the button.

20. The FPD support as claimed in claim 19, wherein the panel bracket is U-shaped and has
- a bottom having
  - an inner edge; and
  - an outer edge;
- an inner wall being formed on and protruding from the inner edge of the bottom; and
- an outer wall being formed on and protruding from the outer edge of the bottom;

the pivot edge of the pivoting leg is pivotally connected to the bottom of the panel bracket;

the stationary bracket is attached to the outer wall of the panel bracket; and the resilient device presses against the outer wall of the panel bracket.

* * * * *